United States Patent
Mylting

[15] 3,690,731
[45] Sept. 12, 1972

[54] APPARATUS AND METHODS FOR UNLOADING BULK FLUENT MATERIALS

[72] Inventor: Lauritz E. Mylting, Ardmore, Pa.

[73] Assignee: Envirotech Corporation, Salt Lake City, Utah ; a part interest

[22] Filed: Aug. 17, 1970

[21] Appl. No.: 64,329

[52] U.S. Cl....................................302/42, 302/58
[51] Int. Cl................................................B65g 53/40
[58] Field of Search..........302/33, 34, 35, 36, 58, 17, 302/42, 52; 222/61, 55

[56] References Cited

UNITED STATES PATENTS

| | | | |
|---|---|---|---|
| 3,122,398 | 2/1964 | Tucker | 302/58 |
| 3,273,942 | 9/1966 | McFarland | 302/17 |

*Primary Examiner*—Evon C. Blunk
*Assistant Examiner*—H. S. Lane
*Attorney*—Brumbaugh, Graves, Donohue & Raymond

[57] ABSTRACT

Vacuum apparatus and methods for unloading bulk fluent material from a receptacle. An unloading tool coupled to a vacuum conveying system is moved through the fluent material at a rate automatically controlled in accordance with the vacuum pressure within the conveying system so as to afford continuous maximum efficiency of intake and conveying of the fluent material. In one embodiment, the unloading tool is supported to pivot in a vertical plane, and automatic controls are provided to coordinate the vertical and horizontal movements of the tool so that the tool nozzle moves along a straight-line path through the material, thereby allowing the nozzle to be maintained at the proper depth for optimum delivery of the material and facilitating the unloading of layers of material of uniform thickness. Structure associated with the unloading tool agitates and redistributes the fluent material in the vicinity of the tool to surround the tool nozzle with a continuous supply of free-flowing material. A safety device breaks the vacuum in the conveying system at a predetermined pressure level, thus avoiding stalling of, or damage to, the system from too high vacuums.

29 Claims, 7 Drawing Figures

Patented Sept. 12, 1972

INVENTOR
LAURITZ E. MYLTING
BY Brumbaugh, Graves,
Donohue & Raymond
his ATTORNEYS Patented Sept. 12, 1972

INVENTOR.
LAURITZ E. MYLTING

BY Brumbaugh, Graves,
Donohue & Raymond
his ATTORNEYS

APPARATUS AND METHODS FOR UNLOADING BULK FLUENT MATERIALS

BACKGROUND OF THE INVENTION

This invention relates generally to the handling of bulk fluent materials and, more particularly, to novel vacuum apparatus and methods for unloading bulk fluent material from a receptacle and for maintaining continuous maximum efficiency of intake and conveying of the fluent material.

Vacuum unloading and transferring apparatus of sundry designs are known and enjoy general usage in the handling of grain, cotton, coal, and other bulk fluent materials. Commonly, they entail a vacuum conveying system including vacuum generating equipment, a conduit for transporting the fluent material, and a pickup, or unloading, tool coupled to the conduit for intake of the material. Difficulties are encountered with such apparatus, however, which limit their utility for many applications and which detract from their superiority over manual or other mechanized material handling techniques and equipment. Not the least of these difficulties are that the vacuum apparatus frequently are not adapted to efficient operation, and particularly to sustained efficient operation throughout all phases of unloading of a receptacle, or are not suitable for use with certain types of bulk material.

One reason for the inefficiency of current vacuum unloading apparatus arises from the manner in which the vacuum unloading tool is moved through the fluent material. Typically, the tool is supported above the receptacle for pivotal movement about a horizontal or vertical axis so as to move through the material along an arcuate path. Actual movement, or sweeping, of the unloading tool is effected remotely by an operator who manipulates the controls of a hydraulic or electrical motive system operatively coupled to the tool. In less elaborate devices, the tool may be manually moved through the material by a worker who walks across the material surface. In both type systems, however, the rate, path, and depth of movement of the tool through the material is determined and, if necessary, adjusted by the operator or worker on the basis of his observations of how well the unloading is proceeding. Not only does this procedure tend to be time consuming, but it often leads to the unloading tool not being moved through the fluent material at a rate or depth, or both, such as to optimize the intake and conveying of the material from the receptacle.

For example, if the tool is moved too slowly, or at too shallow a depth, a cavity, or trench, will form in the vicinity of the intake nozzle of the tool, with the result that the volume of fluent material picked up by the tool will be less than the vacuum system is intended to handle. Conversely, if the tool is moved too fast, or at too great a depth, the intake nozzle will tend to clog, inasmuch as the vacuum system will be unable to handle the increased amount of material presented to the tool.

In either circumstance, it will be apparent that the system will be operated at less than maximum efficiency since in neither case will a full volume of material be picked up and delivered to the conveying system, and in neither instance is the full capability of the unloading apparatus realized. This, of course, will result in longer unloading times, increased man hours per receptacle unloaded, and possibly delays in releasing the receptacle for further use, all of which contribute to increasing operational costs.

Moreover, continuity of unloading and transferring of the material may be seriously disrupted as a consequence of moving the unloading tool at an improper rate or depth. Thus, clogging of the intake tool caused by too fast movement may result in a higher vacuum being drawn within the system than can be withstood without stalling the vacuum generating equipment or perhaps even damaging system components. At best, such clogging necessitates the system being shut down temporarily for cleaning and, if damage has occured, for extended periods for repair and maintenance.

Similar difficulties are experienced with previously known vacuum unloading apparatus where the bulk material to be handled is not entirely free flowing, as, for example, where the material is damp, a fine powder, or otherwise cohesive. Such materials tend to form lumps, stick to the walls of the receptacle, and form trenches around the unloading tool a it sweeps through the material, all of which adversely affect unloading efficiency through increased clogging of the apparatus or through reduced material flow to the unloading tool.

In addition to the foregoing general disadvantages of known vacuum handling apparatus, certain additional considerations exist in specific applications which render such apparatus still further unsatisfactory for use. One such application, to which the present invention is particularly adapted, is the unloading of bulk fluent material, such as cement, from a barge or other water-going vessel. In the unloading of barges and the like, the bulk material is removed in a plurality of layers of approximately equal thickness across the entire barge, or one or more holds of the barge, rather than by removing all of the material from one portion of the barge and thereafter removing all of the material from the other barge portions. This is important because the load carried by the barge must be evenly distributed over the barge structure at all times. Otherwise, the barge might be swamped or even broken in half due to the enormous weight of the material. Accordingly, vacuum unloading apparatus suitable for use in barge unloading applications must be capable of removing layers of material of predetermined thickness across the full width and length of the barge. Ideally, it should be possible beforehand to select the thickness of the layer to be removed and thereafter to maintain such thickness so that a complete layer of approximately equal depth is removed, thus maintaining the trim of the barge. Obviously this would be very difficult to accomplish with conventional vacuum unloading apparatus in which the operator must personally control not only the depth at which the unloading tool nozzle is buried in the material, but also the rate of movement of the tool.

Although some known vacuum unloading apparatus, notably those providing for pivotal sweeping of the unloading tool about a vertical axis, afford horizontal planar movement of the tool nozzle, and hence would allow removal of a uniformly thick layer of material, they generally are unsuitable for unloading receptacles as large as water-going barges inasmuch as they normally require telescoping conveying conduits in association with the unloading tool to permit the tool to reach remote areas of the barge. Such telescoping conduit constructions involve rather complicated vacuum seals which, in addition to being subject to wear and the consequent loss of vacuum pressure, frequently impair the ease of maneuverability of the unloading tool. Moreover, horizontally sweeping apparatus, that is, apparatus in which the unloading tool pivots about a vertical axis, do not avoid the other aforementioned disadvantages of current vacuum unloading apparatus.

The above-described and other disadvantages of previously known systems are overcome by the novel vacuum unloading apparatus and methods of the present invention.

SUMMARY OF THE INVENTION

In accordance with the invention, bulk fluent material is removed from a receptacle by a vacuum unloading tool which is coupled to a vacuum conveying system and is moved through the material along a selected path and at a rate automatically controlled in response to fluctuation of the vacuum pressure level within the conveying system so as to maintain the vacuum pressure level substantially constant and at the proper value for optimum delivery of the system. In a preferred embodiment, the vertical and horizontal movements of the unloading tool are automatically controlled to confine the tool nozzle to substantially straight-line movement at a predetermined depth in the material. In this way, continuous maximum efficiency of intake and conveying of the fluent material is ensured and sustained utilization of the full material-handling capability of the system achieved.

As a further feature of the invention, stalling or damaging of the components of the vacuum unloading apparatus is prevented by a safety device which automatically breaks the vacuum within the system when a vacuum pressure level of predetermined magnitude is reached. Accordingly, should the unloading tool nozzle become clogged despite the controlled movement of the tool tending to prevent this, the safety device will be actuated before the vacuum pressure rises above a safe level. The vacuum breaker device may take the form of a motor-driven, butterfly-type valve that is connected in the unloading tool to vent the tool to the atmosphere. A pressure probe positioned at an appropriate location in the conveying system actuates the valve motor to open the valve when the threshold pressure level is reached.

Another significant feature of the invention is the use of an agitator structure in association with the unloading tool for breaking up and redistributing the material in the vicinity of the intake nozzle of the tool so that the nozzle will always be surrounded by a supply of free-flowing material. Trenching of the material due to cohesiveness or dampness is thus avoided, and the nozzle of the tool thereby tends always to be buried at the proper depth as it sweeps through the material. One convenient type of agitator structure includes an impeller mounted for rotation around the nozzle of the unloading tool and equipped with radial extending vanes or blades. An air motor may be used to rotate the impeller to effect the breaking up and redistribution of the bulk material. Instead of vanes, the impeller may utilize a multiplicity of outwardly directed air jets to agitate the material.

Another significant aspect of the invention is that the aforementioned straight-line movement of the unloading tool nozzle is provided, notwithstanding that the unloading tool is pivoted about a horizontal axis to sweep in a vertical plane. Advantage is taken, therefore, of the manuverability and relatively trouble-free operation of vertically sweeping unloading apparatus, and the need for the telescoping conveying conduit construction associated with conventional apparatus capable of horizontal tool nozzle movement is avoided. Moreover, since the straight-line movement of the nozzle is automatically controlled, the nozzle is always maintained at the same vertical position in the material as it sweeps across the receptacle. The nozzle is thus continuously maintained at the proper depth for optimum intake of material, further contributing to the sustained effective utilization of the unloading apparatus. Also, by selecting beforehand a particular depth of material to be removed in each sweep pass, layers of material of uniform thickness may readily be unloaded. The invention is accordingly well suited to the unloading of water-going barges, and the like, where balanced loading of the barge must be maintained at all times.

More specifically, one embodiment of apparatus constructed according to the invention, and which is especially adapted to the unloading of cement from a water-going barge, includes a fixed column structure located at a mooring facility for the barge and a bridge structure supported on and movable vertically along the column structure. A vacuum conveying conduit leads to the mooring facility from vacuum generating and material receiving and transferring equipment located at a suitable shoresite and is supported at an elevated position relative to the barge by the bridge structure. On the bridge, the vacuum conduit is carried by an elongate boom pivoted at the onshore end to a boom frame that is, in turn, pivoted at the onshore end to the bridge. Finally, the conduit is connected through a relatively short flexible section to the upper end of the unloading tool, the tool being pivotally supported near its upper end to the offshore end of the boom.

Operation of the unloading apparatus is from a control console located on the bridge and, for this purpose, remotely energizable manual and automatic control operating systems are provided. Conveniently, these systems may include power winches for raising and lowering the bridge and hiking the barge along the mooring facility, a hydraulic system, including independently operable fluid motors, for sweeping the unloading tool back and forth across the barge and effecting vertical adjustment of the tool to establish straight-line movement of the nozzle, and automatic controls operatively associated with the fluid motors of the hydraulic system for regulating the rate of sweep of the unloading tool and coordinating vertical and horizontal movements of the tool.

In one form of automatic controls for regulating the rate of sweep of the unloading tool, a pressure monitor is communicated with the conveying system to sense predetermined fluctuations of the vacuum pressure level within the system and, in accordance thereto, to energize a fluid control device in the hydraulic system to vary the rate of flow of hydraulic fluid to the fluid motor that drives the tool, the motor being coupled between the boom and the unloading tool so as to swing the tool about its pivotal axis in the onshore and offshore directions. With this control arrangement, undue deviation in the volume of fluent material being picked up by the unloading tool from the intended amount is detected promptly, such deviation causing a corresponding change in the vacuum pressure level within the system, and the movement of the unloading tool through the material quickly adjusted to return the pressure level to within the optimum range of values. The optimum volume of fluent material is therefore at all times taken up by the unloading tool, while, by virtue of this uniform intake of material, both clogging and underloading of the conveying system are avoided. Desirably, automatic limit switches are provided in association with the hydraulic system to stop the unloading tool after it has traversed a sweep pass of the desired length, as for example, when it approaches one of the side walls of a barge hold.

The hydraulic system of the apparatus also incorporates separate fluid motors coupled between the bridge and the boom frame and between the boom frame and the boom for use in connection with confining movement of the nozzle to a horizontal, line path. Operation of the motor between the bridge and the boom frame is such as to maintain the boom frame level at all times, thereby providing a horizontal reference plane relative to which the straight-line movement of the tool nozzle is maintained in a parallel spaced relation. To this end, an automatic level detector is mounted on the boom frame. Should the boom frame drift from the horizontal, the level detector energizes a hydraulic flow control device in correspondence with the extent of displacement of the frame to allow flow of hydraulic fluid to the motor in a manner to return the frame to level.

Also carried by the boom frame is a cam surface shaped, with due allowance for differences of scale, to approximate the vertical deviation of the straight-line path followed by the tool nozzle from the arcuate path that would be traced by the nozzle if straight-line traversing of the nozzle were not provided for. A cam follower and linkage mechanism supported by the boom and connected to the upper end of the unloading tool translates the pivotal movement of the tool into movement of the cam follower along the cam surface, thus affording mechanical detection of the vertical adjustment that must be made in the position of the tool nozzle to keep the nozzle in the same horizontal plane. Movement of the cam follower actuates a tool position detector which, through a hydraulic flow control device, regulates fluid flow to the motor coupled between the boom frame and the boom to carry out such necessary vertical adjustment of the nozzle. The boom, and hence the unloading tool and tool nozzle, is therefore automatically raised or lowered relative to the boom frame as the tool traverses each sweep pass so as to maintain the nozzle of the tool at the same vertical spacing from the reference plane on the boom frame. The boom frame and reference plane always being maintained at level, the tool nozzle accordingly moves in a horizontal, straight-line path.

Alternative to the use of the boom frame and boom, the tool may be suspended directly from the bridge. In this configuration, sweeping of the tool is accomplished by a fluid motor coupled between the tool and the bridge, with the rate of sweeping being automatically controlled as before. Automatic vertical adjustment of the nozzle, however, is afforded by an appropriately shaped cam surface carried by the tool or bridge for engagement with a cam follower on the bridge or tool, respectively. As the tool swings through a sweep pass, the cam surface and cam follower coact to raise or lower the tool through the distance needed to effect planar movement of the nozzle. By thus mechanically translating sweep position directly into vertical adjustment of the nozzle, the fluid motors and hydraulic detection and leveling controls associated with the boom and boom frame are not needed.

So that vertical movement of the nozzle may occur while still allowing for sweeping action, the upper end of the tool is povitally connected to the bridge through a sliding pivot assembly. The sliding pivot assembly allows up and down sliding movement of the tool pivot structure, conveniently a roller arrangement to reduce friction, in accordance with the vertical displacement imparted to the tool by the camming action of the cam surface and cam follower. A fluid motor preferably is coupled between the sliding pivot assembly and the bridge to permit adjustment of the path of travel of the tool pivot structure which, with this arrangement, must be confined to the vertical to assure straight-line movement of the tool nozzle.

By the foregoing combinations of automatically controlled and coordinated horizontal and vertical movements of the unloading tool, the unloading tool is moved across the barge at the optimum rate and depth for maximum utilization of the material-handling capability of the vacuum apparatus. The apparatus, moreover, tends to maintain itself at a maximum efficiency, since it includes self-correcting controls and does not rely on an operator to make necessary adjustments. Rapid and continuous unloading of the bulk materials is therefore possible, and the barge need only be hiked lengthwise of the mooring facility so that the unloading tool on each pass across the barge will sweep through a new supply of material.

As mentioned, manually operable hydraulic and control systems are provided to allow operation of the apparatus in circumstances where automatic operation is not desired. Also, the foregoing embodiments of the unloading apparatus preferably include the vacuum-breaker safety device and material agitator structure previously described, with the motors for driving the working elements of the mechanisms being conveniently connected to a common compressed air system.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF AN EXEMPLARY EMBODIMENT

For convenience and to a void redundancy of description, an exemplary embodiment of the invention is described herein with reference to the unloading of powdered cement from a water-going barge. It will be understood, however, that the invention is equally applicable to the unloading of other material transport receptacles, such as railroad cars, trucks, and the like, and to the handling of a large variety of other bulk fluent materials, including coal, lime, plaster, grain, cotton, flour, etc.

Figure 1:
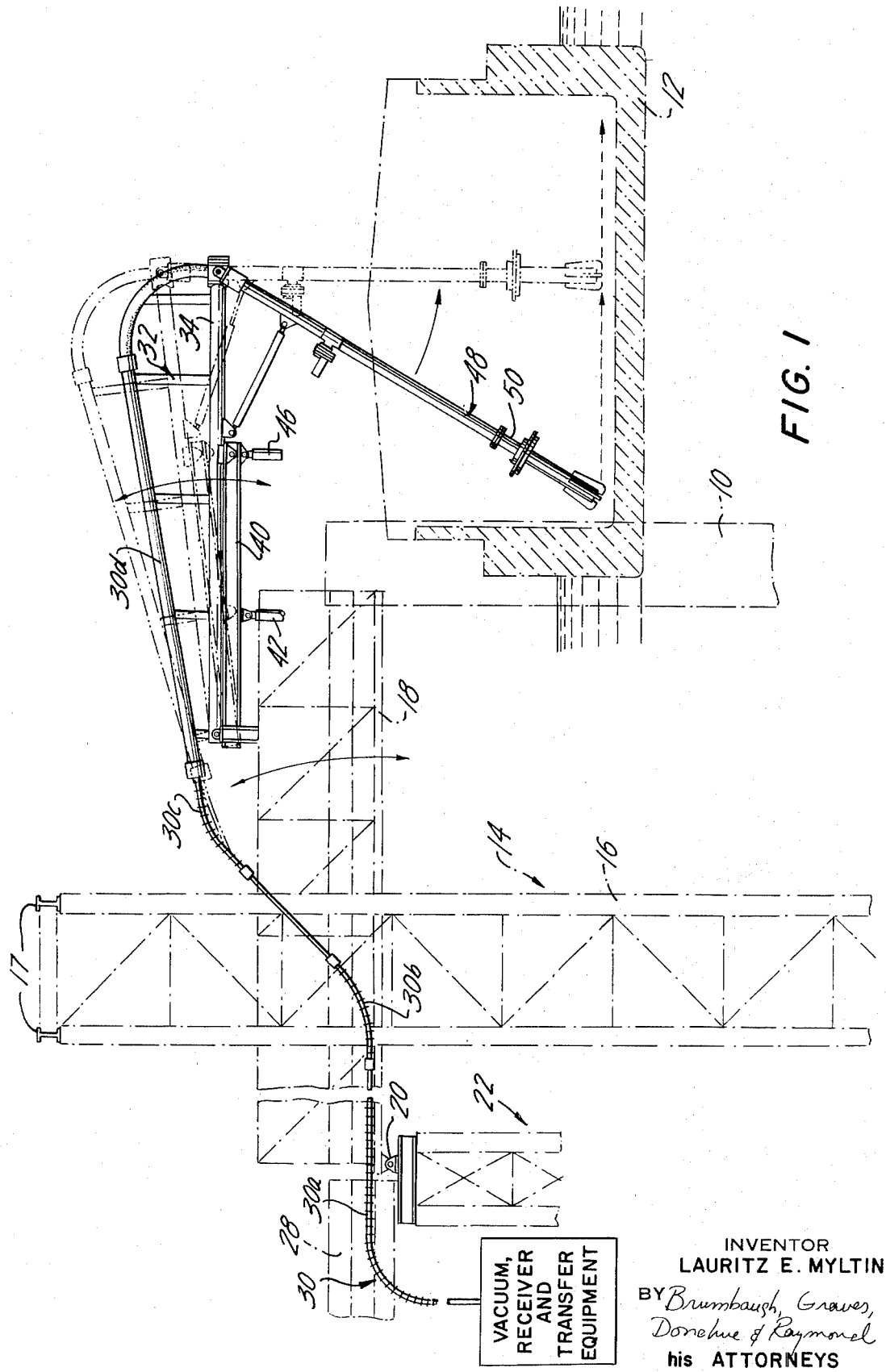
FIG. 1 is an elevational view of one embodiment of vacuum unloading apparatus constructed in accordance with the invention, illustrating use of the apparatus in unloading bulk material from a water-going barge and showing parts of the apparatus in phantom for clarity.
Figure 2:
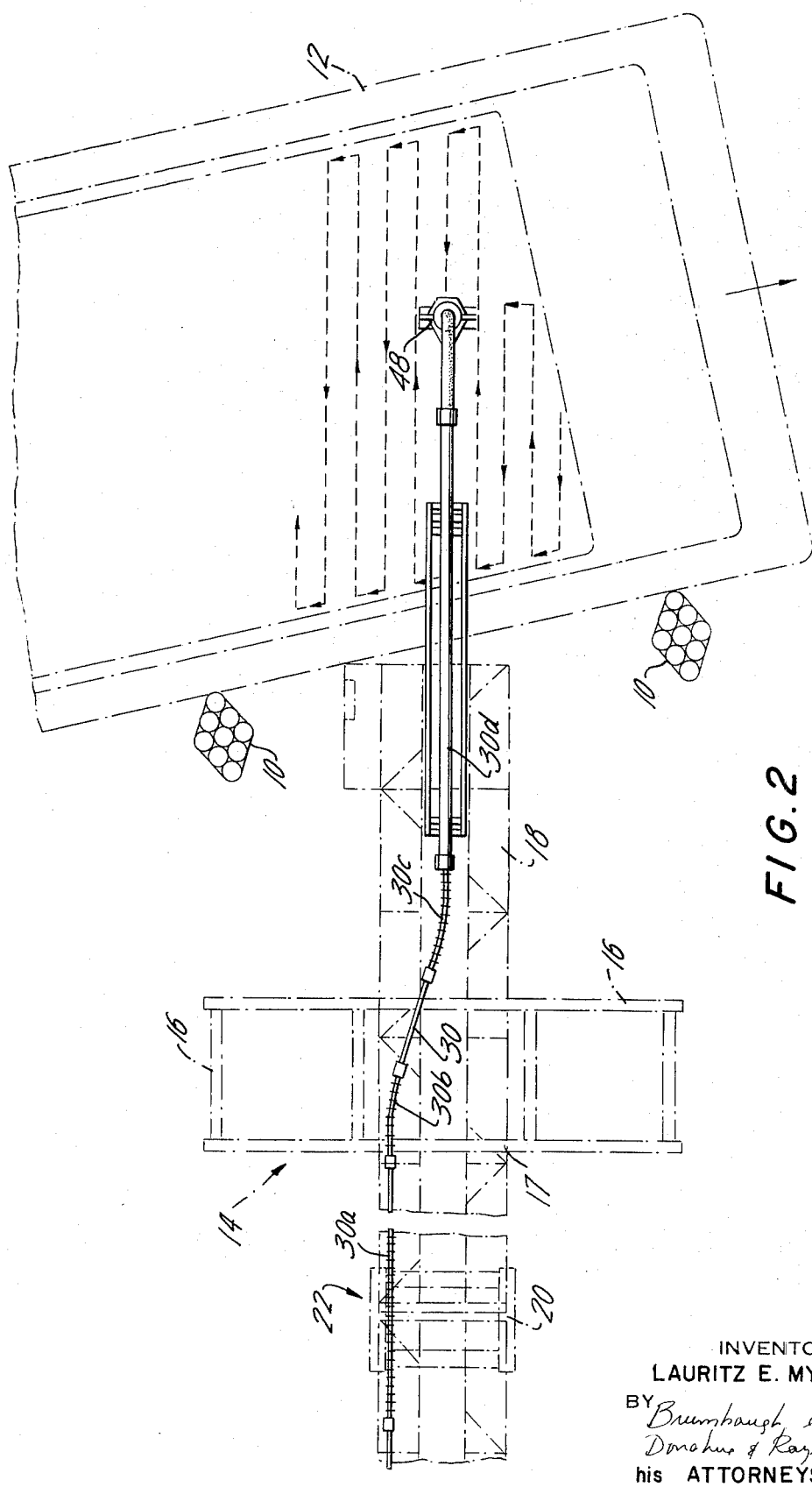
FIG. 2 is a plan view of the embodiment of FIG. 1, also showing certain parts of the apparatus in phantom, depicting the pattern of movement of the unloading tool back and forth across the barge.

Referring first to FIGS. 1 and 2, an embodiment of the vacuum unloading apparatus is shown constructed adjacent a mooring facility having dolphins 10 to which a barge 12 ladened with bulk cement is made fast. An arch-like pier 14, formed preferably by two spaced column structures 16 connected together by cross-frames 17 at their upper ends, supports an access bridge 18 for movement vertically toward or away from the barge. To this end, the bridge 18 is hinged, as at 20, at its onshore end to a second pier 22 so as to be pivotable in a vertical plane (as indicated by the arrows in FIG. 1) between the columns 16 by operation of a power winch 24 (see FIG. 4) carried by the pier structure 14, and from which the bridge 18 is suspended by one or more cables 26.

The pier 22 also supports the offshore end of a fixed access bridge 28 which, together with the movable bridge 18, carries a material conveying conduit 30 leading to the vacuum unloading apparatus at the mooring facility. The conduit 30 forms a part of the vacuum conveying system, connecting at its onshore end (as indicated schematically in FIG. 1) with suitable vacuum generating and material receiving and transferring equipment. Any suitable arrangement of such equipment may be used, and, for example, may include appropriate filtering apparatus, transfer tanks, and rotary feeders for delivering the material from the environment of the operating vacuum of the conveying system to a pressurized transfer system for further transporting the material to, for example, a storage silo. Alternatively, the material may be delivered to railroad cars, or trucks, for direct transport to a more remote destination. Again, the bulk material may be passed directly from the vacuum conveying system through a rotary feeder, or the like, to a storage silo or area at atmospheric pressure, thus eliminating the use of a supplemental pressurized transfer system.

For unloading bulk cement, the conduit 30 advantageously may be on the order of 10 inches in diameter and suitably constructed of steel, except for those locations along its length at which flexing of the conduit is necessary. Thus, a flexible hose section 30a (see FIG. 1) is included in the conduit 30 over the pier 22, and two additional flexible sections 30b and 30c are provided in the portion of the conduit on the bridge 18 to allow flexible connection of the bulk of the conduit to a steel conduit section 30d that, in a manner more fully described hereinafter, is carried by the bridge 18 for pivotal movement relative thereto. If desired, armored sheaths may be provided around the conduit sections 30a, 30b and 30c to protect the flexible hose against damage.

Figure 3:
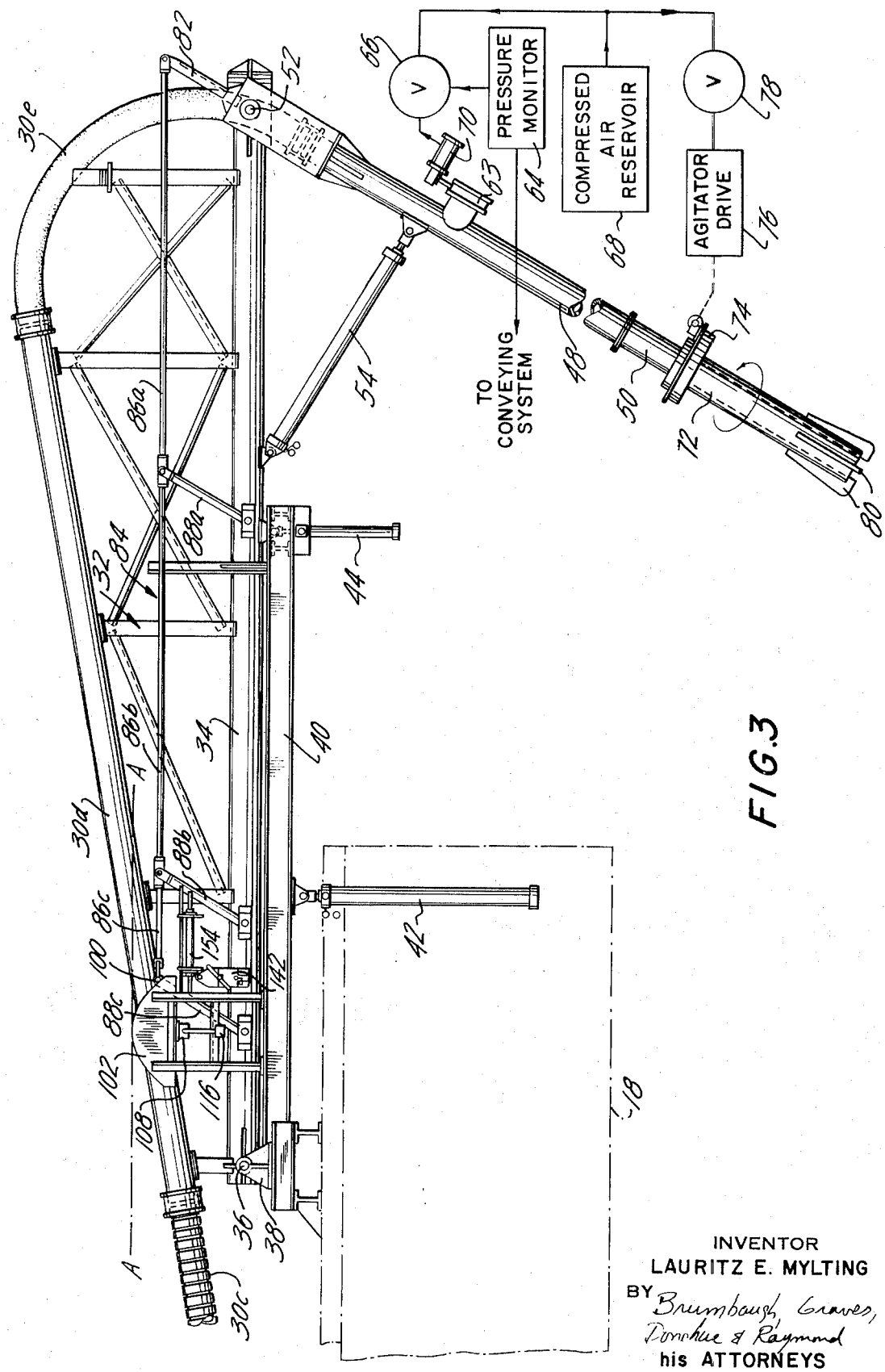
FIG. 3 is an elevational view, on a larger scale than FIG. 1, of the unloading apparatus, particularly showing the construction of the boom frame, boom, and unloading tool and the connections thereto of the fluid motors for driving the apparatus and also schematically illustrating the compressed air system for the vacuum-breaker safety device and the material agitator structure.

With particular reference to FIG. 3, the conduit section 30d is rigidly connected through a suitable frame assembly 32 to an elongate boom 34, which also may be formed of steel piping, with the frame assembly 32 preferably being arranged to support the conduit section 30d so that it is inclined upward in the offshore direction relative to the boom 34. The boom 34, in turn, is pivoted at its offshore end about a generally horizontal shaft 36 extending transverse to the boom 34 between spaced journal mounts 38 carried the bridge 18. Beneath the boom 34, and also pivotally supported by the shaft 36, is a boom frame 40 of a generally rectangular I-beam construction. The boom 34 and boom frame 40 not being fixed in position relative to each other, or to the bridge 18, at any other point along their lengths, each is free to pivot independently about the shaft 36.

To this end, and for reasons made clear hereinafter, separate fluid motors 42 and 44 are coupled between the bridge and the boom frame and the boom frame and the boom, respectively. As illustrated in FIG. 3, the fluid motors 42 and 44 may be of the double-acting hydraulic actuator type and, for convenience, are referred to hereinafter as the "boom frame actuator 42" and the "boom actuator 44." It will be appreciated, however, that other types of fluid motors may be used. Indeed, the hydraulic system illustrated in the drawings is intended to be merely representative, and any motive system of suitable design may be used.

The unloading tool 48, including a material intake nozzle 50, of the vacuum apparatus is supported in depending relation by the offshore end of the boom 34, the tool being journaled about a second generally horizontal shaft 50 so as to swing through an arc beneath the boom 34 in generally the same vertical plane in which the boom 34 and boom frame 40 are themselves pivotable. To facilitate such pivotal movement of the tool 48, the upper end of the tool is coupled to the conduit section 30d through a further flexible hose section 30e. As will be apparent from FIG. 3, the inclined arrangement of the conduit section 30d relative to the boom 34 allows the flexible section 30e to assume a gradual curvature, thus enhancing the flexibility of the section, minimizing wear on the hose material, and reducing the force required to swing the unloading tool about the axis 52.

Movement of the unloading tool 48 is such that it traverses, that is, sweeps across the barge 12, first in one direction and then in the opposite direction in a plurality of sweep passes (see the arrows of FIGS. 1 and 2). Conveniently, it is driven in this back and forth movement by a fluid motor 54, which also may be a double-acting hydraulic actuator and which is referred to hereinafter as the "sweep actuator", coupled between the tool 48 and the boom 34. As with the boom frame actuator 42 and boom actuator 44, the sweep actuator 54 may be replaced with any other appropriate drive mechanism.

By selectively governing the direction and rate of flow of hydraulic fluid to the actuator 54, the direction of sweep and rate of sweep, respectively, of the tool 48 may be controlled. Moreover, since the rate of sweep of the tool bears markedly on the efficiency of intake of material by the nozzle 50, it is also possible to optimize the delivery of the unloading apparatus through control of the sweep rate of the tool.

This results by virtue of the optimum volume intake of material depending in large part upon the vacuum pressure level in the conveying system being within a certain optimum range of values, which condition is turn is determined to a great extent by the sweep rate of the unloading tool.

For example, too rapid movement of the unloading tool tends to produce clogging of the vacuum conveying system and thereby to increase to vacuum pressure above the desired level, inasmuch as the nozzle 50 is unable to handle the large volume of material thus presented to it. On the other hand, too slow movement of the tool frequently results in cavitation or trenching of the material, particularly with such cohesive materials as bulk cement, in the vicinity of the nozzle, with the consequence that an insufficient volume of material is picked up by the tool to maintain the vacuum pressure at a high enough value. In either of these circumstances, the efficiency of the unloading apparatus is reduced. Accordingly, controlling the rate of sweep of the unloading tool so as to maintain the optimum vacuum pressure within the conveying system is important in achieving maximum utilization of the material handling capability of the unloading apparatus and in sustaining such maximum utilization throughout the entire unloading process. As it is an important feature of the invention that the control of the sweep rate, and hence of the pressure level, is accomplished automatically, an appropriate control system is operatively associated with the sweep actuator 54 to effect the desired movement of the unloading tool. In one form of control system, as portrayed schematically in FIG. 4, a pressure monitor 58 is communicated with the vacuum conveying system at an appropriate location, such as, for example, near the vacuum generating equipment, so as, in response to fluctuation of the vacuum level within the system beyond a predetermined range, to energize a flow control device 60 interposed in the hydraulic lines 61 extending between the hydraulic fluid reservoir 62 and the sweep actuator 54. Fluid flow to the actuator 54 is increased or decreased by the flow control device 60 depending upon whether the rate of sweep of the unloading tool is too slow or too fast, as measured by the corresponding drop or rise in the vacuum pressure level within the system.

To this end, the pressure monitor 58 preferably includes a pair of pressure actuated, two-position electric switches, one switch of the pair being preset to close upon the occurrence of the highest permissible vacuum pressure and the other to close upon the occurrence of the lowest permissible pressure, that are operatively connected to a reversible electric motor in the rate control device 60, with the device 60 then conveniently including a variable orifice valve driveably coupled to the electric motor for regulating fluid flow to the sweep actuator. Therefore, if, for example, the vacuum pressure rises above the level set on the high limit switch, the switch will close to energize the electric motor in a direction to restrict the variable orifice to the extent necessary to slow movement of the unloading tool 48 through the material. Slowing of the sweep rate of the tool will, as mentioned, result in a smaller volume intake of material into the nozzle 50 and a consequent drop in the vacuum pressure level. When the pressure has fallen to well within the desired range, the switch will open, stopping the motor, and maintaining the setting of the variable orifice valve so as to continue movement of the tool 48 at the slower rate. Conversely, should the vacuum pressure level drop too far, the other switch will close to energize the electric motor, this time in the opposite direction, so as to open the variable orifice valve and thus increase the sweep rate of the unloading tool, causing a proportional increase in vacuum pressure. Upon increase of the pressure well above the pre-set lower limit, the switch will again open.

With this arrangement, therefore, the vacuum pressure within the conveying system is automatically and continuously maintained within a predetermined pressure range such as has been found to provide optimum material intake and conveying efficiency for the material being unloaded. For example, when unloading bulk cement, the lower switch is preferably set to close upon decrease of the vacuum pressure below about 14 inches of Hg and to open upon increase of the pressure above about 15 inches of Hg. The upper limit switch, on the other hand, is preferably set to close upon increase of the pressure above about 16.5 inches of Hg and to open upon decrease of the pressure below about 15.5 inches of Hg. Hence, it will be appreciated that the automatic controls described will tend to maintain the operating vacuum pressure at approximately 15.0 to 15.5 inches of Hg. The vacuum pressures given are in inches of Hg below atmospheric.

Another important aspect of the invention concerns the prevention of stalling, or causing damage to, the components of the vacuum conveying system, and in particular those of the vacuum generating equipment, owing to the drawing of too high a vacuum within the system because of clogging of the nozzle 50, or unloading tool 48, whether caused by overly rapid sweep rates, caking of the material, or for other reasons. For this purpose, and referring particularly to FIG. 3, a vacuum-breaker safety device 63, conveniently a butterfly-type valve, is provided along the length of the unloading tool 48 to vent the conduit 30 to the atmosphere upon the reaching of a predetermined vacuum pressure level within the system. A second pressure monitor 64, having the usual pressure actuated switch, is therefore connected in the conveying system at an appropriate location, with the switch being connected to a normally closed, solenoid-operated valve 66 which, when open, permits flow of compressed air from a reservoir 68 to an air motor 70 for drivingly opening and closing the device 63. The switch is preferably preset to close, opening the valve 66, at a vacuum pressure well above the operating range of the tool sweep rate controls so as not to interfere with the normal automatic operation of the apparatus. It will, however, be set at a value low enough to prevent stalling of, or possible damage to, the vacuum system. A typical value, for example, may be about 10 percent below design normal operating vacuum.

Once the safety device 63 has been actuated to break the vacuum in the system, the monitor 64 and valve 66 are reset, either manually or automatically, to return the butterfly valve of the device 63 to the closed position. If desired, the operating controls for the apparatus may be interlocked with the pressure monitor 64 or valve 66 to render the apparatus inoperable unless the vacuum breaking system is in a ready condition.

It will be appreciated that other vacuum breaking systems may be used and that the foregoing system is but representative of one possible arrangement. For example, the air motor 70 could be instead a hydraulic motor connected in the hydraulic system for operating the sweep motor 54. Similarly, other valving arrangements could be used to vent the vacuum conduit 30 to atmosphere.

As powdery material such as cement and other inherently cohesive bulk materials tend to trench in the vicinity of the unloading tool nozzle, it is a further important feature of the invention that means are provided in association with the unloading tool to agitate and redistribute the bulk cement so that the tool nozzle is always buried at the proper depth in loose cement as it traverses a sweep pass. One form of structure for accomplishing this result (see FIG. 3) includes an impeller, or sleeve, 72 mounted in surrounding relation to the nozzle and which is rotated (as indicated by the arrow) relative to the nozzle by a ring-and-worm gear train 74, the worm gear of which is driveably connected to an agitator drive 76. The agitator drive 76 preferably is an air motor connected for convenience through appropriate compressed air lines to the air reservoir 68 servicing the vacuum breaker valve motor 70. A solenoid-operated valve 78 is interposed between the agitator drive 76 and the air reservoir 68 to provide on-off control of the rotation of the impeller 72.

To further enhance agitation and redistribution of the cement, a plurality of radially extending vanes 80 are provided adjacent the lower end of the impeller in surrounding relation to the intake end of the nozzle 50. Rotation of the impeller 72 is intended to be continuous throughout the unloading process, and the valve 78 is therefore actuated by the operator at the beginning of the unloading process to supply motive air to the agitator drive. If desired, the valve may be included in the circuit for the automatic sweep control system so as to be opened simultaneously with the beginning of automatic operation of the unloading tool. At the end of the unloading operation, the valve 78 is actuated, either manually or automatically, to close off the supply of air.

It will be appreciated that through the use of the foregoing impeller structure to agitate the bulk cement, the disadvantages associated with trenching of the cement are overcome and a continuous supply of cement in the proper amount is presented to the intake nozzle. This contributes significantly to the efficient utilization of the vacuum unloading apparatus of the invention, inasmuch as it facilitates maintaining of vacuum pressure levels within the system, and therefore unloading tool sweep rates, constant at the optimum values.

As an alternative construction, the vanes 80 may be omitted from the impeller 72 and a series of openings provided along the impeller 72 through which air jets are discharged to agitate the cement surrounding the unloading tool. Appropriate air lines may be provided leading from the compressed air reservoir 68 to the impeller 72 to supply needed air. For ease in coupling of the air lines, rotation of the impeller may be dispensed with if desired. However, additional agitating action is realized, even with air jets, if the impeller 72 is rotated.

A further important aspect of the invention is that the vertical position of the tool nozzle 50 is automatically coordinated at all times with the sweep position of the tool so that the nozzle traverses in a straight, generally horizontal line of movement, (see the arrows in FIG. 1) notwithstanding that the unloading tool 48 swings an arc about the shaft 52. Such straight-line movement of the nozzle is of advantage for at least two reasons. One, it aids significantly in maintaining optimum vacuum levels within the system by ensuring that the nozzle 50 is moved through the material at a constant depth in the material. In this respect, it complements the automatic sweep rate and material agitating and redistributing features of the invention. Second, it allows layers of material of substantially uniform thickness to be unloaded. The second of these advantages is particularly important where balanced loading of the receptacle must be preserved throughout all phases of unloading, as is especially the case with water-going vessels such as the barge 12, and the like.

For example, if all of the cement at one end of the barge 12 were unloaded first, leaving the remainder of the barge fully loaded, there would be danger of the barge swamping or even breaking in half due to the large unbalanced forces resulting from the uneven load distribution. It is common practice, therefore, to unload cement barges, and other water-going vessels, by removing the cement or other bulk material in layers of approximately equal thickness throughout the extent of the barge or of one or more holds of the barge. In large part because of this requirement, unloading of bulk cement from such receptacles has not been automated, but has been conducted with conventional earth-moving type equipment, such as motored front-end unloaders, power shovels, and the like. With the straight-line movement of the unloading nozzle of the present invention, however, such layer-by-layer unloading of the barge is greatly facilitated, and the particular embodiment of the unloading apparatus described in detail herein is accordingly well adapted for such use.

It will be apparent, of course, that for the nozzle 50 to traverse in a straight line as indicated in FIG. 1 the vertical position of the nozzle must be adjusted continuously as the unloading tool 48 sweeps through an arc below the pivotal axis 52. This is accomplished in accordance with the invention by continuously detecting the angular position of the unloading tool relative to a vertical plane passing through the pivotal axis 52 and continuously translating such detection into adjustment of the vertical position of the unloading tool, through pivoting of the boom 34 about the shaft 36, so as to ensure that movement of the nozzle is in a substantially horizontal plane.

Figure 5:
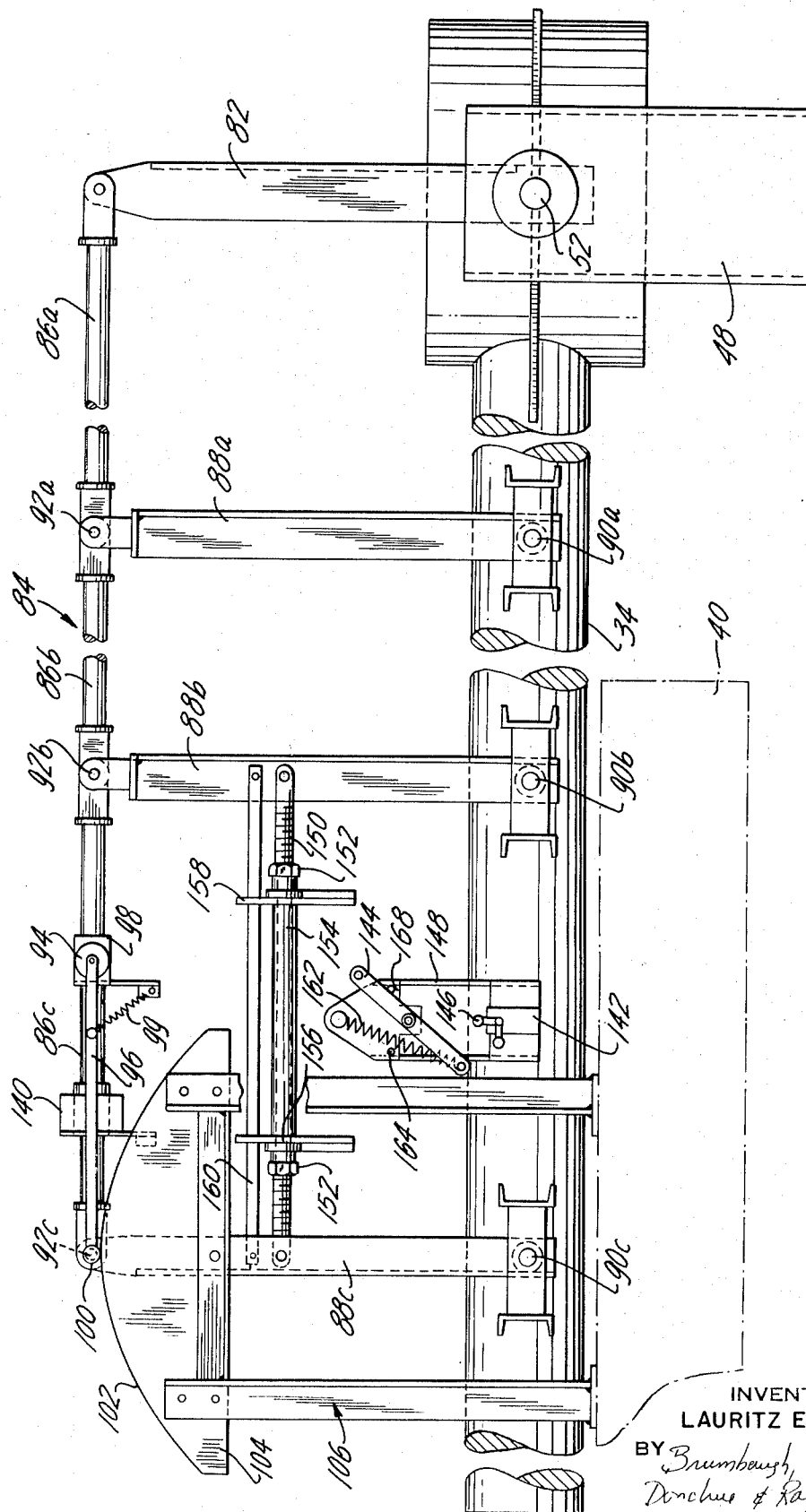
FIG. 5 is an enlarged detail view of the automatic controls for detecting the sweep position of the unloading tool and coordinating therewith the vertical position of the intake nozzle of the tool, and further showing the limit switch arrangement for automatically stopping the unloading tool at the end of a sweep pass.

Turning now in particular to FIGS. 3 and 5, the mechanism for coordinating the vertical and sweep positions of the unloading tool, so as to establish and maintain straight line movement of the nozzle 50, includes a cam and linkage mechanism of which a link 82 is rigidly attached to the upper end of the unloading tool 48 to extend upwardly therefrom in alignment with the longitudinal axis of the tool. At its upper end, the link 82 is pivotally connected to a composite link 84, having in the embodiment shown in the drawings three component links 86a, 86b, and 86c extending back over and parallel to the boom 34. The composite link 84 is supported above the boom 34 by a series of frame elements 88a, 88b, and 88c that are pivoted at their lower ends, as at 90a, 90b, and 90c, respectively, to the boom 34 and at their upper ends, as at 92a, 92b, and 92c, respectively, to the link 84 to allow movement of the link 84 along the length of the boom 34 while maintaining parallel alignment between the boom and the link 84. The link 84 is therefore free to follow the movement of the link 82 fixed to the unloading tool 48 as the tool sweeps back and forth through the material.

Fixed to the link 86c of the composite link 84 is a tool position detector 94 (see FIGS. 4 and 5), preferably a rotary servo valve, that is adapted to be actuated by even slight rotary movement of a mechanical lever arm 96 attached to the detector. Conveniently, a bracket 98 is used to mount the detector on the link 86c and also to anchor a spring 99 that urges the lever arm 96 downward to cause a cam follower 100 at the onshore end of the lever arm to bear against a cam surface 102 formed on a plate 104 appropriately positioned adjacent the onshore end of the lever arm 96.

The cam surface 102 is arcuate, being formed to have substantially zero slope at its midpoint, that is, at the position of the cam follower shown in FIG. 5, and to increase in rate of curvature with increase in distance from the midpoint of the surface in proportion to the distance which the nozzle 50 must be moved at any given sweep position of the tool 48 in order to keep it at the same elevation, that is, in the same horizontal plane.

It will be apparent, therefore, that the detector 94 will be actuated to various degrees depending upon the position of the cam follower 100 along the cam surface 102, and that the position of the cam follower 100 along the surface 102 at any instant will be in direct relation to the angular position of the unloading tool 48 relative to a vertical plane passing through the pivotal axis 52. In other words, for each instantaneous sweep position of the unloading tool 48, there is a corresponding instantaneous position of the cam follower 100 along the cam surface 102. For example, with the unloading tool 48 in the vertical position shown in FIG. 5, the cam follower 100 is at the midpoint of the cam surface 102, and when the unloading tool is in the extreme onshore sweep position of FIG. 3, the cam follower 100 will assume a corresponding position adjacent the extreme offshore end of the cam surface 102. The sweep position of the unloading tool 48 is therefore continuously monitored by the foregoing cam and linkage mechanism and, through the lever arm 96, detected by the tool position detector 94.

In order that such detection of the sweep position of the unloading tool 48 may be translated into straight-line movement of the nozzle 50, it is necessary that a fixed reference plane be established against which adjustment of the vertical position of the unloading tool may be made. In the cam and linkage mechanism portrayed in the drawings, this plane (designated A—A in FIG. 3) has arbitrarily been located tangential to the midpoint of the cam surface 102. That is, vertical movement of the unloading tool 48 in coordination with the sweeping of the tool is such that the nozzle 50 is always maintained at the same vertical spacing from the midpoint (plane A—A) of the cam surface, this spacing being determined by the vertical distance between the plane A—A and the nozzle when the unloading tool 50 is located in the vertical plane passing through the pivotal axis 52 (see FIG. 5 and the position of the tool shown in phantom in FIG. 1).

Figure 4:
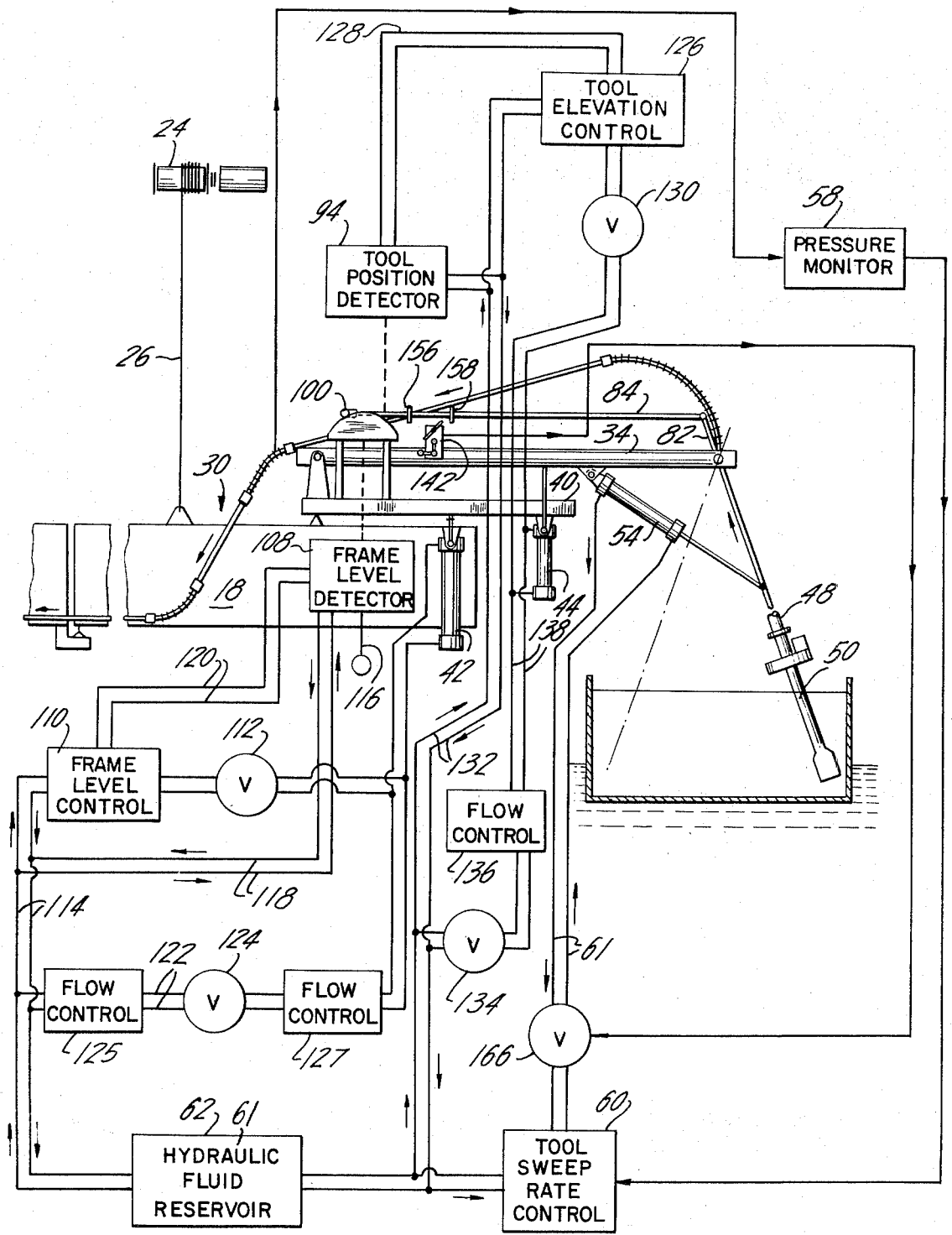
FIG. 4 is a schematic view of one form of the hydraulic system and associated automatic controls for operating the unloading apparatus.

Since all vertical adjustment of the unloading tool is referenced to the plane A—A, it is therefore necessary that provision be made for keeping the plane A—A at the same vertical location and as nearly horizontal as possible. Accordingly, the cam plate 104 is supported on the boom frame 40, by a frame structure 106, for example, in a manner that the reference plane A—A is generally parallel to the plane of the boom frame, and the boom frame 40 and plane A—A are maintained in this horizontal alignment through an automatically controlled hydraulic system operatively connected to the frame actuator 42. As schematically illustrated in FIG. 4, this system includes a frame level detector 108, a frame level control 110, and a solenoid-actuated valve 112, the frame level control 110 and valve 112 being interposed in the hydraulic lines 114 leading from the hydraulic reservoir 62 to the actuator 42. Advantageously, the frame level detector 108 is a rotary servo valve that is fixed to the frame structure 106 for the cam plate 104 and sensitive to and adapted to be actuated by displacement, however slight, from the vertical of a free-swinging pendulum arm 116.

With a valve of this type, additional hydraulic lines 118 (see FIG. 4) are provided to couple the input side of the valve 108 to the hydraulic reservoir 62, while the output side of the valve is coupled through a closed-loop hydraulic circuit 120 to the frame level control 110 which, for example, may be a hydraulically actuated four-way servo valve for controlling the rate and direction of fluid flow to the frame actuator 42 in response to flow in the loop 120. The solenoid-actuated valve 112, on the other hand, is operative upon energization by the operator to allow on-off control of flow to the frame actuator.

Operation of the foregoing system is fully automatic and is such that displacement of the boom frame 40 and plane A—A from their respective fixed horizontal planes, which necessarily produces a corresponding deviation of the pendulum arm 116 from the vertical, will result in the detector 108 creating fluid flow in the closed-loop 120 in a direction to open the frame level control 110 to the extent and position necessary to allow hydraulic fluid flow to the actuator 42 in the direction and rate needed to return, whether by raising or lowering, the boom frame 40 and plane A—A to the horizontal, and hence the pendulum 116 to the vertical. Inasmuch as the detection of displacement of the boom frame from the horizontal and the actuation of the actuator 42 to correct such displacement are therefore nearly instantaneous, the boom frame 40 and reference plane A—A are continuously and automatically maintained in a horizontal condition to provide a substantially fixed reference plane against which adjustments may be made to the vertical position of the unloading tool.

It is sometimes desirable during unloading operations to raise or lower the bridge 18 a considerable distance. For example, the unloading tool 48 is initially positioned vertically relative to the barge 12 by moving the bridge 18 along the column structures 16. This, of course, is accomplished through operation of the power winches 24. However, it is desirable in these circumstances that the boom frame 40 be susceptible of being leveled manually rather than through the use of the automatic level maintaining system. Accordingly, separate hydraulic lines 122 (see FIG. 4) are coupled between the hydraulic reservoir 62 and the frame actuator 42, and a solenoid actuated on-off valve 124 and two flow control devices 125 and 127 for regulating the rate of hydraulic fluid flow to and from the actuator are provided in the hydraulic lines 122 to allow manual raising and lowering of the boom frame. During manual operation, the valve 112 in the automatic leveling system is closed to render that system inoperative; conversely, the valve 124 in the manual system is closed when the automatic system is in use.

Turning now to the manner in which vertical movement of the unloading tool relative to the plane A—A is effected and referring in particular to FIG. 4, automatic controls are operatively associated with the boom actuator 44, which, as noted, is coupled between the boom 34 and the boom frame 40, to raise or lower the boom and unloading tool 48. These controls include the tool position detector 94, a tool elevation control 126, a closed-loop hydraulic circuit 128, a solenoid-actuated valve 130, and appropriate hydraulic lines 132 interconnecting the hydraulic reservoir 62 with the tool position detector 94 and, through the tool elevation control 126 and the valve 130, the boom actuator 44.

As previously mentioned, movement of the unloading tool 48 from the vertical position shown in FIG. 5 causes, through the link 82 and the composite link 84, a corresponding movement of the cam follower 100 along the cam surface 102 and a consequent and proportional angular displacement of the lever arm 96 from the horizontal position it occupies when the tool 48 is in the FIG. 5 position. The shape of the cam surface 102 is such that as the tool 48 swings away from or towards the vertical the cam follower 100 and arm 96 are displaced downward or upward respectively, from the horizontal by a distance, allowing for differences of scale, indicative of the distance the nozzle 50 must be lowered or raised to keep the nozzle 50 at the same elevation relative to the plane A—A, that is, the elevation of the nozzle when the tool is vertically oriented. It will of course be apparent that as the tool sweeps away from the vertical, in either the on-shore or off-shore direction, the cam follower 100 moves from the midpoint towards the opposite end of cam surface 102 (see FIGS. 3 and 4), and as it swings towards the vertical the follower moves back towards the midpoint of the surface 102, again in a direction opposite to the direction of sweep of the tool 48.

The rotary servo valve constituting the tool position detector senses this displacement of the arm 96 and, in response thereto, produces fluid flow in the closed-loop circuit 128 to make appropriate adjustment to the tool elevation control 126, preferably a four-way servo valve. The valve 130 is energized beforehand so that flow of hydraulic fluid through the lines 132 is possible.

The hydraulic connection between the tool position detector 94 and the tool elevation control 126 is such that when the lever arm 96 is horizontal, the control 126 is positioned so that the flow of hydraulic fluid to both sides of the boom actuator 44 is balanced in a way to maintain the boom 34 stationary at whatever pivotal position about the axis 36 it happens to be in. Moreover, the detector 94 is preset always to return the elevation control 126 to this balanced flow position, that is to say, at all times to urge the lever arm 96 to a level repose. Any movement of the lever arm 96 from the horizontal, as when the unloading tool 48 moves to a different angular position relative to the vertical, will therefore result in the tool position detector 94 causing the tool elevation control 126 to adjust the rate of flow to the actuator 44 so as to move the boom 34, and with it the composite link 84 and tool position detector 94, vertically a distance sufficient to return the lever arm 96 to the horizontal and thus to return the tool elevation control 126 to the balanced flow position. Since the unloading tool 48 necessarily moves vertically along with the boom 34, the nozzle 50 will also be returned to the horizontal, and since such vertical movement of the boom and nozzle occur automatically and continuously, the effect is that the nozzle is maintained at the same elevation, or in the same horizontal plane, throughout its movement in any given sweep pass. In other words, the vertical spacing between the reference plane A—A and the horizontal plane containing the intake end of the nozzle 50 is maintained constant as the unloading tool sweeps back and forth across the barge 12.

It is desirable also that it be possible manually to raise or lower the boom 34 and unloading tool 48 independently of raising or lowering the boom frame 40, although the boom and boom frame may be moved together simply by driving the frame actuator 42 while holding the boom fixed relative to the frame, and for this purpose a solenoid-actuated valve 134, flow rate control device 136, and hydraulic lines 138 are connected between the hydraulic lines 132 and the boom actuator 44 to allow by-passing of the automatic elevation control system described above. Accordingly, during manual operation, the valve 130 is closed to render the automatic control system inoperative and the valve 134 opened to allow flow of hydraulic fluid from the reservoir 62 through the hydraulic lines 138 to the actuator 44. So that both raising and lowering of the boom frame 34 may be accomplished, the valve 134 desirably is selectively movable to three positions, one allowing fluid flow to raise the boom frame, one allowing fluid flow to lower it, and a third for shutting off flow to the actuator 44 altogether, this last position allowing the lines 138 to be closed when automatic operation is being carried out.

During manual raising or lowering of the boom 34 and the boom frame 40, the angular separation of the boom and the boom frame may be on occasion be greater than when the automatic control systems are in use, and as a result the lever arm 96 of the tool position detector 94 might be displaced to a much greater extent than would otherwise occur. A stop bracket 140 (see FIG. 5) is therefore provided on the link 86c to limit the vertical movement of the lever arm 96 and thereby retain it in position to engage the cam surface 102 upon the moving together again of the boom 34 and the boom frame 40. Also, possible damage to the lever arm 96 or the tool position detector 94 resulting from large vertical displacement of the lever arm is avoided.

More completely to automate the unloading operation and to facilitate the unloading of material from barges and other receptacles of different widths, an adjustable switch mechanism is provided to limit the length of sweep of the unloading tool 48 in either direction. Referring especially to FIG. 5, this mechanism includes a limit switch 142 and a spring-loaded switch actuator arm 144 that is positioned to engage an L-shaped toggle 146 constituting the operator element of the switch 142. Conveniently, the switch 142 and actuator arm 144 are carried by a bracket 148 attached to the boom 34.

Immediately above the bracket 148 and extending between the frame elements 88b and 88c is a threaded rod 150 on which is adjustably positioned, as, for example, by the jam nuts 152, a sleeve 154. The sleeve 154 in turn carries a pair of spaced dogs 156 and 158 that are oriented to engage the upper end of the actuator arm 144 upon movement of the frame elements 88b and 88c through a predetermined horizontal distance. A guide rod 160 may be provided adjacent the upper ends of the dogs 158 to maintain alignment of the dogs with the actuator arm 144.

With appropriate manipulation of the jam nuts 152, and, when necessary, variation of the length of the sleeve 154, the positions of the dogs 156 and 158 are adjustable along the length of the rod 150 to allow control of the distance through which each must move before engaging the actuator arm 144. In this way, the length of sweep of the unloading tool in either direction can be controlled. For example, as the unloading tool 48 reaches the extreme offshore end of a sweep pass (see FIG. 4), the dog 158 will contact the actuator arm 144 and move it in the onshore direction (to the left as viewed in FIG. 5) until it passes the dead-center pivot point, at which time the spring 162 attached to the arm will cause it to snap over against the onshore stop 164 and, in so doing, cause the arm 144 to engage the toggle 146 to operate the switch 142. As illustrated schematically in FIG. 4, such operation of the switch 142 causes a valve 166, conveniently a solenoid-actuated three-position valve, in the hydraulic lines 61 to move from one open position, at which hydraulic fluid is admitted to the sweep actuator 54 to cause the tool 48 to sweep in the offshore direction, to the closed position to stop the sweeping movement of the tool. Conversely, as the unloading tool reaches the onshore end of a sweep pass, the dog 156 will engage the arm 144, causing it to snap past dead center against the offshore stop 168, throw the toggle 146 in the opposite direction, and thereby cause the valve 166 to be moved to the closed position from the other open position at which hydraulic fluid is admitted to the actuator 54 to provide sweeping movement of the unloading tool 48 in the onshore direction. By this arrangement, the unloading tool 50 is automatically stopped at the onshore and offshore ends of each sweep pass. Also, the length of each sweep pass can be adjusted as desired to provide for full sweep passes of different lengths or to provide for sweeping of the tool over only a portion of an arc about the axis 52. That is, the unloading tool 48 could be constrained to traverse a pass that extends, say, from a position adjacent the onshore side of the barge 12 to approximately the midpoint of the barge and back again.

After the unloading tool 48 has reached the end of a given sweep pass and has been stopped by engagement of the switch 142, a new sweep pass is begun by the operator through actuation of the valve 166 to move it to the appropriate open position. Prior to beginning a new pass, however, it is contemplated that the barge 12 or other receptacle will be moved perpendicularly of the sweeping direction so as to move a new portion of the bulk material into the line of sweep. This may be accomplished in any convenient manner; for example, in the case of a barge containing a load of cement, power winches (not shown) located on the mooring facility and controlled remotely from the operator's console on the bridge 18, can be used to hike the barge the necessary distance along the facility.

Figure 6:
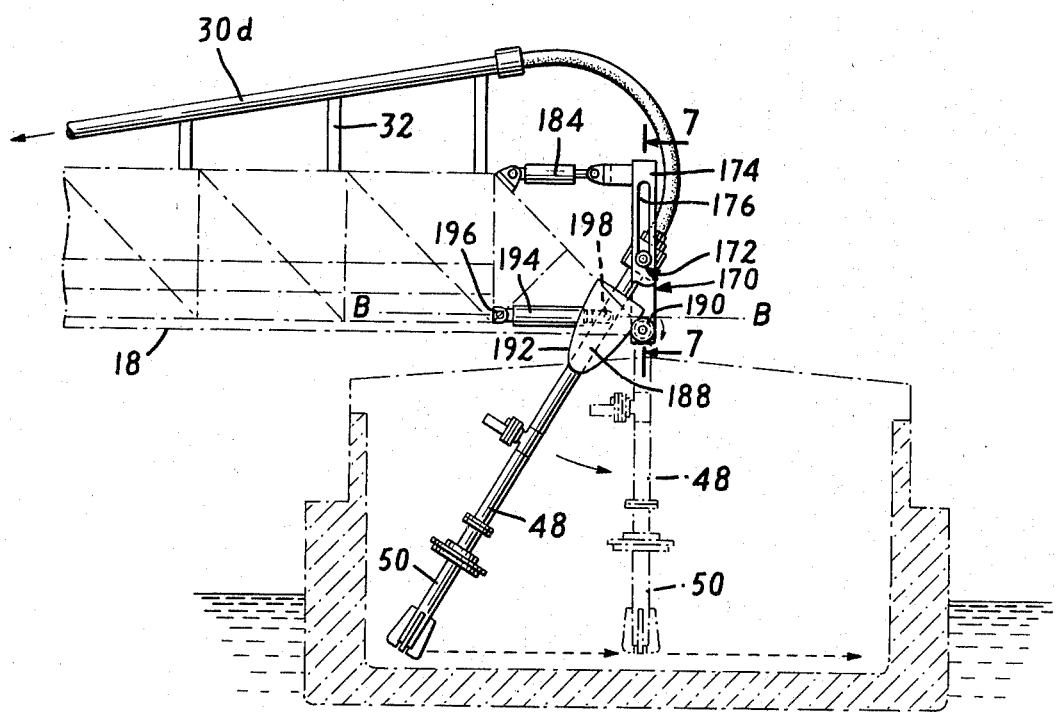
FIG. 6 is an elevational view of another form of the vacuum unloading apparatus of the invention.
Figure 7:
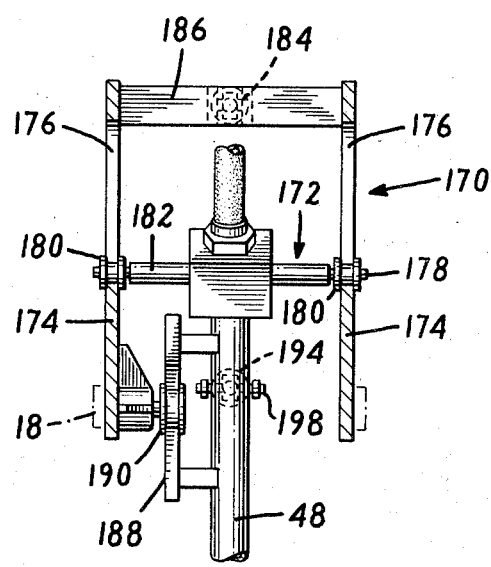
FIG. 7 is an enlarged detail view of the cam surface and cam follower structure of the apparatus of FIG. 6, and also shows the sliding pivot assembly for allowing vertical displacement of the tool and tool nozzle.

Another manner of coordinating the vertical and sweep positions of the tool 48 is illustrated in the embodiment of the apparatus shown in FIGS. 6 and 7. In this embodiment, the boom and boom frame, along with the hydraulic elements and controls associated therewith, are eliminated, and the tool 48 is suspended directly from the offshore end of the bridge 18, while the conduit section 30d and the associated frame assembly 32 rest on the bridge.

The tool 48 is supported by a pivot assembly 170 carried by the bridge and a pivot structure 172, which incorporates the pivotal axis of the tool, carried by the tool. The assembly 170 includes a pair of spaced vertical members 174 (see FIG. 7) each of which is formed with an elongate slot 176 that together constitute guides for allowing vertical movement of the pivot structure 172 and hence of the pivotal axis of the tool.

The pivot structure 170, in turn, includes a horizontal shaft 178 having at its ends a pair of flanged rollers 180, one of which is received in each of the elongate slots 176. A sleeve 182 attached to the upper end of the tool 48 contains the shaft 178 in rotatable fashion, thus allowing pivoting of the tool in a vertical plane, as indicated by the arrow in FIG. 6.

Since, for reasons hereinafter made clear, the guide slots 176 must be maintained in a vertical alignment, the members 174 are pinned at the lower ends to the offshore end of the bridge 18. A fluid motor 184, preferably a double-acting hydraulic actuator of the type previously described, is connected to the upper ends of the members 174, for example, through a cross member 186, to provide for pivoting of the members 174 about their lower ends to keep them at the vertical regardless of the orientation of the bridge 18 relative to the horizontal. The actuator 184 is remotely controlled from the operator's position on the bridge, both manual and automatic systems being provided for this purpose as in the previous embodiment.

Vertical movement of the tool nozzle 50 is carried out by a cam plate 188 mounted on the tool 48 (see FIG. 7) and a cam follower 190, carried by the bridge 18 or one of the guide members 174. Conveniently the cam follower is a rotatable flanged roller to reduce friction and to hold the cam plate 188 in a captured position between the flanges. The follower 190 is located on the centerline of the elongate slots 176 (see FIG. 6).

Actual coordination of the instantaneous sweep and vertical positions of the nozzle 50 is effected by the shape of the cam surface 192 formed on the plate 188. As is apparent from FIG. 6, the cam surface 192 is arcuate, with substantially zero slope at its midpoint, and of increasing rate of curvature with increase in distance from the midpoint of the surface in proportion to the vertical displacement which must be imparted to the nozzle 50 at any given sweep position of the tool in order to keep the nozzle at the same elevation. Thus, not only is the tool 48 raised and lowered mechanically, without the need of additional fluid motors or the like, but the sweeping movement of the tool is translated directly into vertical positioning of the nozzle. This results in a simplified arrangement as compared to the embodiment of FIGS. 1 to 5.

Sweeping of the tool across the barge is carried out, as before, by a sweep actuator 194 (see FIG. 6) with the actuator being coupled between the bridge 18 and the tool 48. For ease of operation, the actuator 194 is pivoted at its onshore end 196 to the bridge 18 and at its offshore end 198 to the tool 48. It is free, therefore, to pivot in the plane of the tool as the tool is raised and lowered by the cam surface 192 during a sweep pass. Also, the sweep actuator 194 should be positioned such that when the tool 48 is at either end of a sweep pass, for instance the onshore end, as indicated in FIG. 6, the angle subtended by the actuator 194 and the guide members 174 should be at least as great as 90°. By this arrangement, the actuator will exert a lifting force on the tool in both sweep directions and thereby facilitate movement of the cam surface 192 relative to the cam follower 190.

It will be apparent that the plane B—B of the embodiment of FIGS. 6 and 7, against which adjustments to the vertical position of the nozzle 50 are referenced to confine the nozzle to a horizontal plane, is tangent to the surface of the cam follower 190 at the point of intersection therewith of the centerline of the slots 176. The midpoint of the cam surface 192, of course, rests in the plane B—B when the tool is in the vertical position, that is, the position shown in phantom in FIG. 6. So that the cam surface 192 and cam follower 190 will coact to move the tool the appropriate vertical distance for any given sweep position, it is necessary that the path of movement of the pivotal axis, i.e., the shaft 178, be confined to the vertical. Hence, the guide members 174 must always be maintained at the vertical during operation of the apparatus. As previously mentioned, this is provided for by the fluid actuator 184. If desired, an automatic plumb-determining mechanism can be associated with the members 174 and the actuator 184 to preserve such vertical alignment automatically.

The rate of sweep is automatically controlled as previously described in connection with the embodiment of FIGS. 1 to 5. Therefore, the rate of sweep will be substantially uniform throughout a sweep pass notwithstanding that the pivotal movement of the sweep actuator 194 about its onshore end 196 will result in variation in the horizontal force, that is to say, the pivoting force, exerted on the tool 48. If desired, limit switches (not shown) may be associated with the cam plate 188, actuator 194, or any other suitable component of the apparatus, to allow control of the length of the sweep pass.

OPERATION

The following description of the manner of operation is made with reference to the embodiment of FIGS. 1 to 5. However, due to the basic similarity between the two embodiments illustrated, the operation of the embodiment of FIGS. 6 and 7 will likewise be clear to those skilled in the art from this description.

In the unloading of a barge, such as that portrayed at 12 in FIGS. 1 and 2, with the vacuum unloading apparatus of the present invention, the barge 12 is made fast to the dolphins 10 of the mooring facility so that the front portion of the foremost cargo hold is aligned with the unloading tool 48 (see FIG. 2). Meanwhile, the material transporting equipment, if any, for receiving the bulk cement from the vacuum conveying system is brought on line, and the hydraulic system and associated automatic controls for the unloading apparatus are brought to full operating pressure and readiness.

Thereafter, the bridge winch 24 (see FIG. 4) is engaged to lower the bridge 18 about the pivotal axis 20 to the operating position, and the boom frame 40 is manually, that is, by actuation of the valve 124 to supply hydraulic fluid through the lines 122 to the frame actuator 42, raised to a horizontal plane at an appropriate elevation, for example, approximately 22 feet above the barge. The vacuum conveying systems and the compressed air system for the vacuum breaker device 63 and agitator drive 76 are started up, and with the unloading tool 48 in the plumb direction (the position shown in phantom in FIG. 1), the boom 34 is lowered manually by operation of the solenoid valve 134 until the nozzle 50 is buried at the appropriate depth, say, about 3 feet, in the bulk cement.

The manual vertical control systems are then deactivated, and the automatic frame level controls and tool detection and elevation controls are engaged.

Sweeping of the unloading tool 48 is then begun. First, the pressure monitor 58 and sweep rate control device 60 are activated to provide automatic regulation of the volume intake of cement and, hence, of the vacuum pressure level within the conveying system. Desirably, the solenoid valve 78 (see FIG. 3) is also opened at this time to start rotation of the agitator impeller 72.

If unloading is commenced at a corner of the barge (as is depicted in FIG. 2), or at any time thereafter when unloading from a corner or other confined area, the unloading tool 48 preferably is swept back and forth across the barge through manual selective energization of the solenoid valve 166. When clear of the corners, however, the limit switch 142 is brought into electric connection with the valve 166 so as to govern the length of sweep of the tool in accordance with the predetermined positioning of the limit dogs 156 and 158. If found necessary as unloading proceeds, the dogs 156 and 158 can of course be reset to provide a sweep pass length of greater or lesser extent. Within the limits determined by the positions of the dogs 156 and 158, the unloading tool 50 sweeps across the barge 12 in the manner indicated by the arrows in FIG. 2, that is, first in an offshore direction, for example, and then in the opposite or onshore direction.

It will be appreciated, moreover, that as the tool moves through the sweep passes, its rate of movement is automatically controlled by the pressure monitor 58 and sweep rate control device 60 in accordance with the vacuum pressure level existing within the vacuum conveying system, and that generally horizontal movement of the nozzle is automatically maintained by the combined action of the frame level controls, including the frame level detector 108 and the frame level control 110, and the tool elevation controls, including the cam and linkage mechanism, tool position detector 94, and the tool elevation control 126. Accordingly, as it moves through the material, the loading tool 48 traces a path of selected depth in the material and at a rate of movement previously determined to be optimum for the material being unloaded. Maximum efficiency in unloading and handling cement and other bulk fluent materials is therefore realized.

At the end of each sweep pass, the loading tool is stopped upon the throwing of the switch 142 and the consequent closing of the valve 166. At this time, the unloading tool is manually raised above the material surface, again through opening of the valve 134 controlling fluid flow to the boom actuator 44, and the barge 12 is hiked along the mooring facility in the direction of the arrow in FIG. 2, thus moving a fresh supply of cement into position beneath the unloading tool. The unloading tool is then manually lowered into the material to bury the nozzle at the same depth as before, the automatic frame level controls and tool detector and tool elevation controls are again activated, and the valve 166 is energized to the appropriate position to begin automatic sweeping action, normally in the opposite direction. It will be recalled that the valve 166 is automatically closed by the throwing of the switch 142 as the unloading tool 48 reaches the end of each sweep pass. Therefore, the unloading tool will remain stationary during the movement of the barge along the mooring facility, and it is necessary for the operator to energize the valve 166 to begin a new sweep pass. With soft material like bulk cement, the tool need not be raised, and the barge can be hiked along the facility as soon as the tool ends a sweep pass.

One or more passes of the unloading tool may be made at each lengthwise position of the barge along the mooring facility until a layer of cement of the desired depth is removed. It will be understood, of course, that, if desired, all of the material beneath the unloading tool could be removed by repeatedly passing the unloading tool back and forth across the barge before the barge is moved lengthwise. As previously mentioned, however, it is desirable when unloading water-going barges, and the like, to remove the material in layers so as to maintain a balanced load on the barge. Other types of receptacles, such as railroad cars, trucks, etc., may not demand the same load balancing consideration and therefore all of the material located at each lengthwise position of the receptacle may be unloaded before the receptacle is moved to a new lengthwise position.

This may be accomplished readily with the apparatus of the present invention simply by lowering the unloading tool 48 at the end of each sweep pass and traversing the material again along the same line of sweep but in the opposite direction, and repeating this back and forth movement of the tool until all of the material in that particular line of sweep has been removed.

It will be understood by those skilled in the art that the above-described embodiment is intended to be merely exemplary, in that it is susceptible of modification and variation without departing from the spirit and scope of the invention as defined in the appended claims.

I claim:

1. Vacuum unloading apparatus for removing bulk fluent material from a receptacle comprising:
   a vacuum conveying system including a conduit,
   a vacuum unloading tool communicating with the conduit and having an intake nozzle for receiving the fluent material,
   means for controllably sweeping the unloading tool through the fluent material thereby progressively to pick up fluent material in the line of sweep, and
   means responsive to fluctuation of the vacuum pressure level within the conveying system for automatically controlling the rate of sweep of the unloading tool so as to maintain the vacuum pressure within a predetermined range, thereby to ensure continuous optimum intake of the fluent material into the unloading tool nozzle.

2. Apparatus according to claim 1 further comprising safety means for automatically breaking the vacuum in the conveying system upon the vacuum pressure within the system reaching a predetermined level.

3. Apparatus according to claim 2 in which the safety means includes:
   a normally closed vent in the unloading tool, the vent being operative when open to communicate the interior of the unloading tool to the atmosphere, and
   means responsive to a predetermined vacuum pressure level within the conveying system for automatically opening the vent.

4. Apparatus according to claim 2 further comprising means associated with the unloading tool for agitating the fluent material to facilitate its entry into the tool nozzle.

5. Apparatus according to claim 1 further comprising means associated with the unloading tool for agitating the fluent material to facilitate its entry into tool nozzle.

6. Apparatus according to claim 5 in which the agitating means includes a rotary impeller structure carried by the unloading tool adjacent the nozzle.

7. Apparatus according to claim 6 in which the impeller structure includes a sleeve surrounding the tool nozzle and mounted for rotation thereon, and having outwardly extending fins adapted to dislodge material in the region around and above the nozzle.

8. Apparatus according to claim 1 in which the means for controlling the rate of sweep of the unloading tool comprises:
 a fluid motor for moving the unloading tool along a line of sweep, the motor being operatively coupled to the unloading tool and to a source of motive fluid under pressure,
 flow control means operatively interposed between the fluid source and the motor for controlling the rate of fluid flow to the motor, and
 means communicating with the vacuum conveying system for sensing the vacuum pressure level therein and, in response to predetermined fluctuations thereof, for regulating the flow control means so as to control the rate of fluid flow to the fluid motor and hence the rate of sweep of the unloading tool.

9. Apparatus according to claim 1 further comprising means for automatically maintaining the tool nozzle in substantially a horizontal plane throughout its sweeping movement, thereby to allow the tool to be moved through the material at a predetermined depth.

10. Vacuum unloading apparatus for removing bulk fluent material from a receptacle comprising;
 a vacuum conveying system including a conduit,
 a vacuum unloading tool communicating with the conduit and having a nozzle for receiving the fluent material,
 means supporting the unloading tool generally above the receptacle for pivotal movement about a first generally horizontal axis spaced along the length of the tool from the nozzle,
 means for controllably pivoting the unloading tool about the first axis thereby to cause the nozzle to sweep an arc generally below the first axis,
 means for moving the nozzle of the tool vertically,
 means for continuously detecting the sweep position of the unloading tool relative to the support means therefor, and
 means responsive to such detection for continuously moving the nozzle of the tool vertically to maintain substantially straight-line movement of the nozzle.

11. Apparatus according to claim 10 in which the support means for the unloading tool includes:
 a support structure carrying a portion of the conveying system conduit at an elevated position relative to the receptacle,
 a boom mounted on the support structure generally above the receptacle for pivotal movement about a second generally horizontal axis, the unloading tool being supported on the boom member in generally depending relation for pivotal movement about the first horizontal axis, the first axis being substantially parallel to and spaced horizontally from the second axis.

12. Apparatus according to claim 11 in which the means for moving the nozzle of the unloading tool vertically comprises means for controllably pivoting the boom about the second horizontal axis, thereby to cause the boom to sweep an arc such as to move the first axis and hence the unloading tool generally vertically.

13. Apparatus according to claim 12 further comprising:
 a frame mounted on the support structure for pivotal movement about the second horizontal axis,
 means on the frame defining a reference plane against which pivotal movement of the boom and hence vertical movement of the unloading tool nozzle is referenced,
 means for automatically maintaining the reference plane horizontal at a predetermined elevation above the bulk material, and
 in which the means for pivoting the unloading tool is a first double-acting fluid motor coupled between the unloading tool and the boom, the means for pivoting the boom is a second double-acting fluid motor coupled between the boom and the frame, and the means for automatically maintaining the reference plane horizontal includes a third double-acting fluid motor coupled between the frame and the support structure.

14. Apparatus according to claim 13 further comprising means responsive to fluctuation of the vacuum pressure level within the vacuum conveying system for controlling the rate of fluid flow to the first fluid motor, thereby to control the rate of sweep of the unloading tool so as to maintain the vacuum pressure within a predetermined range and hence to maintain optimum intake of material into the nozzle.

15. Apparatus according to claim 10 further comprising means for automatically controlling the rate of sweep of the unloading tool in response to fluctuation of the vacuum pressure level within the conveying system so as to maintain the vacuum pressure within a predetermined range and hence to maintain optimum intake of the fluent material into the nozzle.

16. Apparatus according to claim 10 further comprising safety means for automatically breaking the vacuum in the conveying system upon the vacuum pressure reaching a predetermined level.

17. Apparatus according to claim 10 further comprising means associated with the unloading tool for agitating the fluent material to facilitate its entry into the nozzle of the tool.

18. Apparatus according to claim 17 wherein the agitating means includes a rotary impeller structure carried by the unloading tool adjacent the nozzle.

19. Apparatus according to claim 18 wherein the impeller structure includes a sleeve surrounding the nozzle and mounted for rotation thereon, and having outwardly extending fins adapted to dislodge material in the region around and above the nozzle.

20. Apparatus according to claim 11 wherein the support means includes a fixed column structure portion and a bridge portion movable vertically on and supported by the column structure portion, and wherein the boom is mounted on the bridge portion thereby to be movable therewith to alter the elevation of the unloading tool.

21. Apparatus according to claim 11 wherein the conduit of the vacuum conveying system includes a flexible portion supported on the boom and coupled to the unloading tool, the flexible portion being trained into a curve providing a smooth transition from the tool to the main part of the conduit and affording articulation of the unloading tool by flexing along the curvature thereof as the tool is pivoted.

22. Vacuum unloading apparatus for removing bulk fluent material from a receptacle comprising;
  a vacuum conveying system including a conduit,
  a vacuum unloading tool communicating with the conduit and having a nozzle for receiving the fluent material,
  means supporting the unloading tool generally above the receptacle for pivotal movement about a first generally horizontal axis spaced along the length of the tool from the nozzle,
  means for controllably pivoting the unloading tool about the first axis thereby to cause the nozzle to sweep an arc generally below the first axis,
  means for permitting vertical movement of the first axis;
  coacting cam means carried by the tool and the tool support means for effecting vertical movement of the tool and hence of the first axis, and
  means for automatically coordinating the vertical movement and the pivotal movement of the tool to provide substantially horizontal movement of the tool nozzle, said means including the cam means having a cam surface shaped to define the vertical distance the first axis must be displaced at each instantaneous sweep position of the tool so as to maintain the tool nozzle in substantially the same horizontal plane through an entire sweep pass.

23. Apparatus according to claim 22 in which the cam surface is carried by the tool, and in which the cam means further includes a cam follower carried by the tool support means.

24. Apparatus according to claim 23 further comprising means for confining the path of movement of the first axis to a vertical plane.

25. Apparatus according to claim 24 in which the means for permitting vertical movement of the first axis comprises:
  a pivot structure secured to the tool and incorporating the first axis; and
  a sliding pivot assembly carried by the tool support means, with the pivot structure being received by the pivot assembly to allow vertical sliding motion of the first axis.

26. A method of unloading bulk fluent material from a receptacle with vacuum unloading apparatus including a vacuum conveying system and an unloading tool communicating therewith comprising:
  passing the unloading tool through the material along a selected path,
  sensing the vacuum pressure within the conveying system, and
  automatically varying the rate of movement in the unloading tool through the bulk material in response to fluctuation of the vacuum pressure level so as to maintain the vacuum pressure within a predetermined range, thereby to ensure continuous optimum intake of material into the unloading tool.

27. A method according to claim 26 further comprising agitating the bulk material surrounding the unloading tool to break up and redistribute the material thereby to facilitate intake of the material into the tool.

28. A method according to claim 26 further comprising automatically coordinating horizontal and vertical movement of the unloading tool so that it moves in a substantially straight-line path through the material.

29. A method according to claim 26 further comprising agitating the bulk material surrounding the unloading tool to break up and redistribute the material, thereby to facilitate intake of the material into the tool.

* * * * *